United States Patent [19]
Jones

[11] Patent Number: 6,142,177
[45] Date of Patent: Nov. 7, 2000

[54] AGRICULTURAL AMMONIA TOOL BAR THROTTLE VALVE

[76] Inventor: James Michael Jones, 413 W. Jefferson, Waxachie, Tex. 75165

[21] Appl. No.: 09/291,569

[22] Filed: Apr. 14, 1999

[51] Int. Cl.⁷ ................................................. F16K 31/145
[52] U.S. Cl. ...................... 137/549; 137/495; 137/510; 251/61.1; 251/118
[58] Field of Search ............... 251/61.1, 30.05, 251/118; 137/549, 510, 509, 495

[56] References Cited

U.S. PATENT DOCUMENTS

| | | | |
|---|---|---|---|
| 2,102,865 | 12/1937 | Vickers | 137/509 |
| 2,510,991 | 6/1950 | Mazzeo | 251/118 |
| 3,368,582 | 2/1968 | Kotel et al. | 137/549 |

Primary Examiner—A. Michael Chambers
Attorney, Agent, or Firm—Jenkens & Gilchrist

[57] ABSTRACT

A simple ammonia tool bar throttle valve is disclosed which is primarily for use with those systems which will utilize a stripper pump unit to increase the ammonia system pressure prior to the metering devices. The ammonia tool bar throttle receives the metered ammonia at a greater pressure than that of the system storage tank, and enters a lower chamber where it crosses a filter before exiting the unit across a throttle orifice which is throttled by the action of an aluminum throttle diaphragm which separates the lower chamber from a control chamber. The aluminum throttle diaphragm is positioned to maintain the desired mass flow by the forces of a separately regulated ammonia control fluid which is throttled to the control chamber before being bled back to the storage tank across an orifice.

8 Claims, 1 Drawing Sheet

AGRICULTURAL AMMONIA TOOL BAR THROTTLE VALVE

BACKGROUND

The present invention relates to mechanical and electronic anhydrous ammonia fertilizer application systems.

The typical electronically controlled ammonia application systems consist of a nurse tank trailed behind a tool bar which is attached to a tractor. A computer console is mounted accessible to the tractor operator.

The nurse tank is a pressure vessel which contains the ammonia in its liquid state. The liquid withdrawal valve is mounted at the top of the tank and has a dip tube which extends to the bottom of the tank. A suitable hose connects this valve to a filter connected to a main shutoff valve mounted on the tool bar. The ammonia then flows through a heat exchanger unit, then through a turbine or venturi meter, then to an electronically controlled throttling valve, then to one or more manifolds, and finally through suitable hoses to the applicator knives which insert the ammonia into the soil. In operation, it is a virtually open system from the throttling valve all the way to the knives.

The typical mechanical systems are about the same as the electronic systems, however they utilize a single manually adjustable mechanical meter which feeds the ammonia to one or more manifolds. The manifolds route the ammonia to several hoses, each of which feed a single knife. In operation, it is also an open system past the meter all the way to the knives.

As the liquid ammonia enters the dip tube located at the bottom of the tank, its thermodynamic conditions begin to change. The ammonia begins to expand. This results in the formation of ammonia vapor within the system. The swath width of the tool bar and the desired amount of ammonia per acre are entered into the computer. The computer receives signals from either a turbine or venturi type meter and from the ground speed sensor. The computer processes the data and compensates for any variations by electronically controlling the throttling valve.

These systems work fairly well, but under certain conditions problems can arise. They lose all control of the ammonia as soon as it crosses the throttling valve, in the electronic systems, or the meter, in the mechanical systems. In cooler weather the pressure difference across the system is reduced and sagging hoses can cause the formation of plugs of liquid ammonia which result in uneven distribution to the applicator knives. Crops such as corn require more than twice the amount of ammonia per acre than the smaller grain crops. The greater expansion of the ammonia across the total system often forms more vapor than a typical heat exchanger unit can handle.

It would be a distinct advantage to have an ammonia control device which would provide the means necessary to provide for greater control and application accuracy. The present invention provides such a unit.

SUMMARY

The present invention is directed to a device for maintaining control over a stream of ammonia that addresses the needs identified above. One embodiment of the present invention includes a housing having an ammonia chamber and a control chamber, a throttle diaphragm assembly separating the ammonia chamber from the control chamber of the housing, and a throttle body having an outlet passage in fluid communication with a throttle orifice. The throttle diaphragm assembly is positioned between a closed position and an exposed position by the pressure differential between the control chamber and the ammonia chamber. The throttle orifice of the throttle body is positioned with the ammonia chamber of the housing such that the throttle diaphragm assembly blocks flow through the throttle orifice in the closed position and allows flow through the throttle orifice in the exposed position. A control passage and a bleed passage are in fluid communication with the control chamber of the housing, and an ammonia outlet is in fluid communication with the ammonia chamber in the housing.

In further embodiment, the throttle diaphragm assembly comprises a rigid diaphragm and a resilient seal, with the resilient seal urging the rigid diaphragm towards the closed position.

In another further embodiment, the ammonia throttle valve further includes a filter surrounding the throttle orifice of the throttle assembly and being resiliently mounted between the housing and the throttle diagram assembly.

In yet another further embodiment, the throttle valve includes a stop post limiting the movement of the throttle diaphragm assembly at the exposed position.

In yet another further embodiment, the throttle valve includes a bleed orifice disposed in the bleed passage.

DETAILED DESCRIPTION

Figure 1:
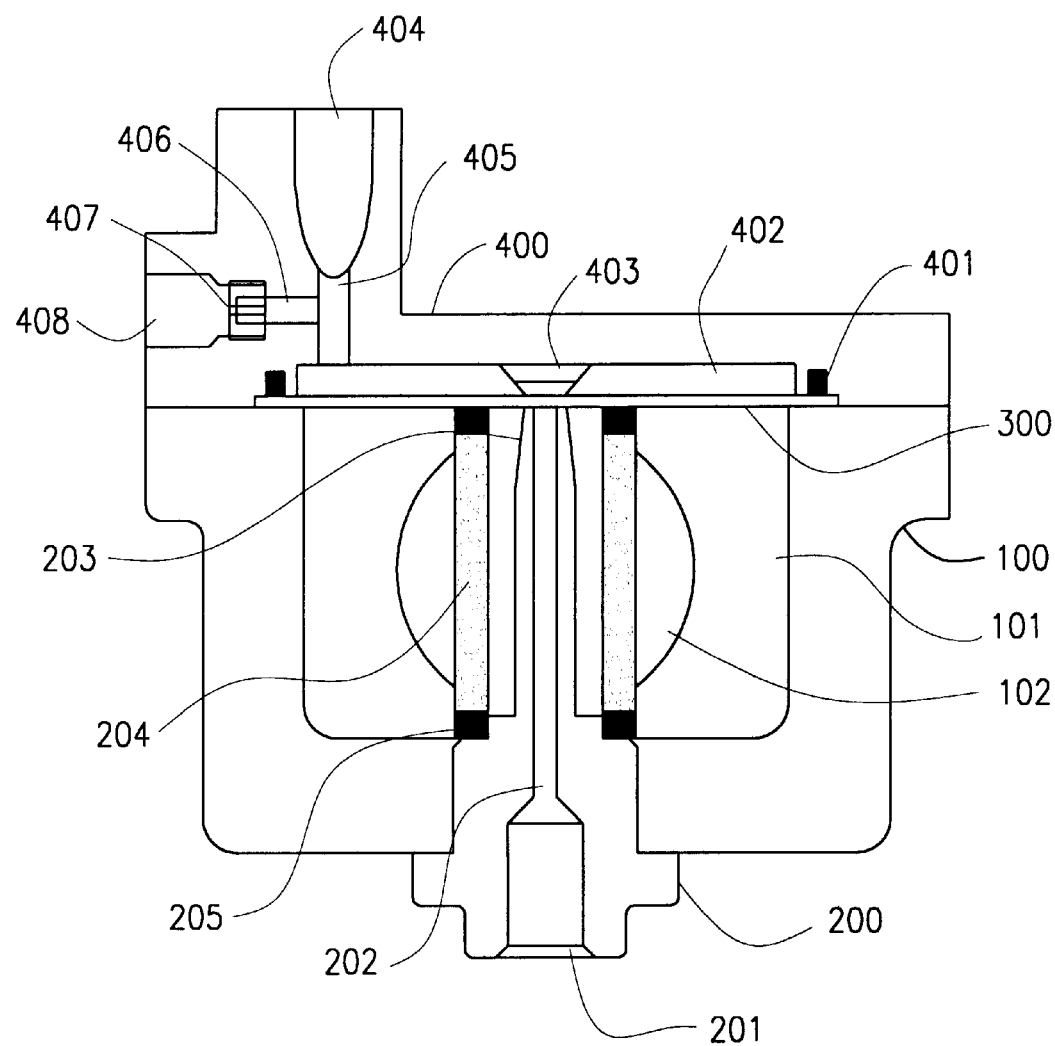
FIG. 1 is a cross sectional illustrating an embodiment of the present invention.

The art of this invention is the art of maintaining control over the stream of ammonia past the initial metering devices, until it is throttled just prior to exiting the system across one or more knives or injectors. The present invention relates to the copending patent application filed by the same inventor, James Michael Jones, on the same day herewith, entitled "Agricultural Liquid Ammonia Pump-Vapor Stripper", with an attorney docket number of 27858-00009, which is hereby incorporated herein in its entirety by specific reference thereto.

In an embodiment of the present invention, a tool bar throttle valve is comprised of a main body which has a large vertical center bore which receives the metered ammonia under an increased pressure which is supplied by an ammonia pump-vapor stripper unit. The ammonia inlet is actually a horizontal through bore which allows for several tool bar throttles to be joined. The bottom of the main body receives a throttle orifice fitting which provides a valve seat at its uppermost end and means to attach a hose or conduit to feed an injector or knife at its lowermost end. The center bore of the main body also receives a filter which has resilient seals on each end. An aluminum throttle diaphragm is positioned between the top of the main body and the cover bonnet. The cover bonnet receives a resilient o-ring type seal which at rest lightly loads the aluminum throttle diaphragm downward against the filter and the valve seat of the throttle orifice fitting. The aluminum diaphragm separates the control chamber formed by the cover bonnet from the metered ammonia chamber of the main body.

In operation, the control chamber of the cover bonnet is in fluid communication with the lower pressure of the ammonia storage tank across an orifice and a normally closed at rest demand solenoid valve. The control chamber, in the systems utilizing the mechanical type meter, is also in fluid communication with a mechanical servo control unit which throttles ammonia to the control chamber in order to maintain a constant pressure difference across the mechanical type meter. Formed within the control chamber of the cover bonnet is a stop post situated directly above the aluminum throttle diaphragm where it rests upon the valve seat of the throttle orifice fitting, which serves to limit the lift of the diaphragm, which in this embodiment is approximately 0–025".

Should the desired constant pressure difference across the metering barrel feeding the throttle orifice of the tool bar throttle be 10 PSI, a drift towards a pressure difference of 9 PSI indicates an increase in pressure downstream of the metering barrel. The servo control senses the pressure increase and positions itself to restrict the flow of ammonia to the control chamber which results in an upward movement of the aluminum throttle diaphragm which results in an increase of flow across the system to return it to a balanced position.

Inversely, a drift towards a pressure difference of 11 PSI results in a decreased downstream pressure which the servo control senses and positions itself so as to increase the flow of ammonia to the control chamber resulting in a downward movement of the aluminum throttle diaphragm thereby restricting the flow and returning the system to a balanced position.

The electronically controlled ammonia application systems which utilize either a turbine or venturi type meter instead of a manually adjustable mechanical meter can also utilize the tool bar throttle valve of the present invention. The mechanical servo control unit, which controls the flow across the throttle orifice of the tool bar throttle would be replaced with a duty cycle solenoid which would electronically control the flow of ammonia to the control chamber. In operation, the on board computer and its software would control the cycling of the solenoid(s) in order to maintain the desired flow for either the broadcast applications or for the satellite mapping type systems which can vary the flow rate between individual rows or manifolds.

Referring now to FIG. 1, there is shown a cross sectional view of an ammonia tool bar throttle valve, indicated generally at 10, illustrating an embodiment of the present invention. The tool bar throttle valve 10 generally comprises a main body 100, a throttle orifice fitting 200, an aluminum throttle diaphragm 300, and a cover bonnet 400. The main body 100 forms an ammonia chamber 101 and includes an ammonia inlet 102 which feeds the metered ammonia to the ammonia chamber 101. The bottom end of the main body 100 receives the throttle orifice fitting 200 which has an outlet bore 201 and a second smaller bore which forms a throttle orifice 202. The upper end of the throttle orifice fitting 200 tapers to form a throttle valve seat 203. The main body 100 also receives a circular filter 204 which has resilient seals 205 on each end—Situated-atop. the main body 100 is an aluminum throttle diaphragm 300 which at rest is lightly loaded against the throttle valve seat 203 by the force of a resilient O-ring 401 which is received by the cover bonnet 400. A control chamber 402 includes a stop post 403 which limits the lift of the aluminum throttle diaphragm 300 during operation. An ammonia control fluid inlet 404 feeds the control ammonia to the control chamber 402 through a passage 405. In operation, the control fluid is bled off though a passage 406 across a bleed-orifice 407 to a threaded outlet 4118 where the control fluid is routed back to the tank across a normally closed at rest demand solenoid.

In operation, the metered ammonia entering the ammonia inlet 102 and the control fluid entering the control fluid inlet 404, which acts upon the aluminum throttle diaphragm 300, are at a greater pressure than the tank pressure due to the applied force of a separate stripper pump. (The control fluid leg of the system never crosses the main mass metering devices, it is taken from upstream of the primary-metering device and is bled back to the tank across the bleed orifice 407.) The throttling of the control fluid entering the control chamber 402 is controlled separately—by either a mechanical servo device on those systems using mechanical type meters, or by a computer controlled duty-cycle solenoid on the electronic and the satellite type systems. An increase in the flow of control fluid into the control chamber 402 results in a downward movement of the aluminum throttle diaphragm 300 which restricts the flow from the ammonia inlet 102 across the filter 204, the throttle valve seat 203, through the throttle-orifice 202 where it exits across the outlet 201 which is connected either to a suitable conduit routed to an individual injector or knife, or to a manifold which can feed several injectors or knives. Inversely, a decrease in the flow of control fluid to the control chamber 402 results in an upward movement of the aluminum throttle diaphragm 300 which increases the flow through the throttle orifice 202 and out of the system.

What is claimed is:

1. A ammonia throttle valve, comprising:
   a housing having an ammonia chamber, with an ammonia inlet, and a control chamber with a control inlet passage and a bleed-off passage;
   a throttle diaphragm assembly separating the ammonia chamber from the control chamber in said housing;
   a throttle body having an outlet passage in fluid communication with a throttle orifice; and
   wherein the throttle orifice of said throttle body is positioned within the ammonia chamber of said housing such that the relative pressures in the ammonia chamber and the control chamber position said throttle diaphragm assembly between a closed position blocking the throttle orifice of said throttle body and an exposed position exposing the throttle orifice of said throttle body.

2. The ammonia throttle valve according to claim 1, further including a filter surrounding the throttle orifice of said throttle body and being resiliently mounted between said housing and said throttle diaphragm assembly.

3. The ammonia throttle valve according to claim 1, further including a stop post limiting the movement of said throttle diaphragm at the exposed position.

4. The ammonia throttle valve according to claim 1, further including a bleed passage orifice disposed within said bleed passage.

5. The ammonia throttle valve according to claim 1, wherein said throttle diaphragm assembly comprises a rigid diaphragm and a resilient seal, and wherein said resilient seal urges the rigid diaphragm towards the closed position.

6. The ammonia throttle valve according to claim 5, further including a filter surrounding the throttle orifice of said throttle body and being resiliently mounted between said housing and said throttle diaphragm assembly.

7. The ammonia throttle valve according to claim 5, further including a stop post limiting the movement of said throttle diaphragm at the exposed position.

8. The ammonia throttle valve according to claim 5, further including a bleed passage orifice disposed within said bleed passage.

* * * * *